(12) United States Patent
Kornblit (10) Patent No.: US 6,473,281 B1
(45) Date of Patent: Oct. 29, 2002

(54) AUTOMATIC PROTECTION DEVICE WITH GROUND FAULT ANNUNCIATION

(75) Inventor: Morris J. Kornblit, Pittsburgh, PA (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 09/641,007

(22) Filed: Aug. 17, 2000

(51) Int. Cl.⁷ .............................. H02H 3/16; H02H 3/00
(52) U.S. Cl. ..................... 361/42; 361/93.2; 340/650
(58) Field of Search ................... 361/42, 44, 93.1, 361/93.2; 324/522, 113; 340/650, 635; 702/64, 65

(56) References Cited

U.S. PATENT DOCUMENTS

| | | | |
|---|---|---|---|
| 4,319,298 A | * 3/1982 | Davis et al. | 361/24 |
| 5,258,885 A | * 11/1993 | Hattori et al. | 361/79 |
| 5,933,306 A | 8/1999 | Santos et al. | |
| 6,167,329 A | * 12/2000 | Engel et al. | 361/93.2 |

OTHER PUBLICATIONS

GE Electrical Distribution & Control; Application Engineering Information; *Ground–Fault Protection for Solidly Grounded Low–Voltage Systems*, 1991.

DET–061 Data Sheet; *Spectra RMS Molded–Case Circuit Breakers with Microversatrip Plus and Microversatrip PM Trip Units*, 1994.

* cited by examiner

Primary Examiner—Kim Huynh
(74) Attorney, Agent, or Firm—Cantor Colburn LLP (57) ABSTRACT

A trip unit, such as one comprising a current sensor generating a current signal indicative of current in a power circuit, an analog to digital converter converting said signal into digital form, and a controller monitoring the current signal and sensing whether an over current condition exists and whether a ground fault condition exists. In case of an over-current condition, the controller causes a trip signal to be output resulting in the power circuit being opened. In the case of a ground fault condition, the controller causes an annunciation output signal but does not generate a trip signal in the case of a ground fault condition and therefore does not cause the power circuit to be opened.

25 Claims, 5 Drawing Sheets

AUTOMATIC PROTECTION DEVICE WITH GROUND FAULT ANNUNCIATION

BACKGROUND OF THE INVENTION

This invention relates to circuit breakers. More specifically, this invention relates to trip units for circuit breakers having switchable protection or annunciation for various fault conditions.

Circuit breakers are designed for opening a circuit upon the detection of a fault condition. A trip unit monitors current sensors and outputs a trip signal when a fault condition is detected. Some trip units monitor the current for overload or over-current conditions but have no ground fault sensing capability. Other trip units are available for opening a circuit when an over-current condition or ground fault condition exists. In addition, electronic circuit breakers having sensors to determine when these conditions exist sometimes include annunciation capability, so that an engineer or electrician can determine what fault condition arose to cause the circuit breaker to open the circuit.

However, in certain situations it is desirable or even necessary to provide annunciation that a ground fault condition exists, but without opening the circuit. For example, in the case of critical life-saving equipment in hospitals and in the case of fire pumps, it is required by the National Electric Code that ground fault conditions be detected but for annunciation only, not for breaking the circuit. The National Electric Code also permits annunciation-only in the case of industrial processes, where shutting down a manufacturing process due to a ground fault in one sub-system can cause expensive down time.

Accordingly, there remains a need in the art for a circuit breaker implementing a ground-fault sensing circuit that annunciates a ground fault condition but does not open the power circuit in the case of a ground-fault condition.

BRIEF SUMMARY OF THE INVENTION

The above-discussed and other drawbacks and deficiencies of the prior art are overcome or alleviated by a trip unit for annunciating a ground fault condition including a current sensor generating a current signal indicative of current in a power circuit, an analog to digital converter converting said signal into digital form, and a controller monitoring the current signal and sensing whether an over current condition exists and whether a ground fault condition exists. In the case of an over-current condition, the controller causes a trip signal to be output resulting in the power circuit being opened. In the case of a ground fault condition, the controller causes an annunciation output signal but does not generate a trip signal and therefore does not cause the power circuit to be opened.

BRIEF DESCRIPTION OF THE DRAWINGS

Referring now to the exemplary drawings wherein like elements are numbered alike in the several figures:

FIG. 10 shows a block diagram of a remote monitoring computer; and

FIG. 11 shows a flow chart for operation of a remote monitoring computer of an embodiment of the invention.

DETAILED DESCRIPTION OF THE INVENTION

The above-discussed and other drawbacks and deficiencies of the prior art are overcome or by a trip unit having a typical sensing means to monitor the power line for a ground fault condition and annunciating means for annunciating a ground fault condition.

Figure 1:
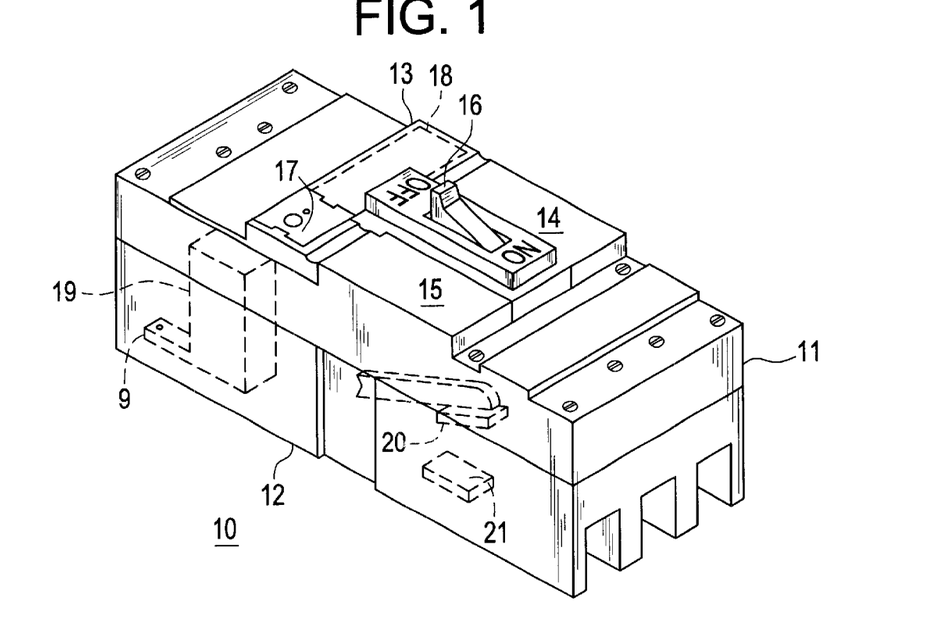
FIG. 1 is a perspective view of a circuit breaker of the invention.

FIG. 1 shows a circuit interrupter 10 of the type consisting of a molded plastic cover 11 secured to a molded plastic case 12. The provision of an accessory cover 13 and accessory doors 14, 15 allows field as well as factory-installed electric accessories such as described in U.S. Pat. No. 5,302,786 issued Apr. 12, 1994 to Rosen et al. An externally-accessible operating handle 16 controls the open and closed conditions of the movable contact 20, and fixed contact 21 located within the case to allow and interrupt current flow through an associate electrical distribution circuit.

Automatic circuit protection against overload circuit conditions is provided by means of an electronic trip unit 18 located within the circuit interrupter cover. A rating plug 17 allows the circuit interruption rating to be set by externally accessing the electronic trip unit as described within U.S. Pat. No. 5,204,798 issued Apr. 20, 1993 to Scott. Connection with an external distribution circuit is made by means of the load strap 9 that extends within the modular current transformer 19 for sensing the current therethrough. While current transformer 19 is shown, any means of sensing current may be used, such as Hall-effect sensors or giant magnetic resistors (GMR) such as are disclosed in U.S. Pat. No. 5,933,306 issued Aug. 3, 1999 to Santos et al.

Although a molded case circuit breaker is shown, the invention is not limited to molded-case circuit breakers, which are generally limited to current capacities of 1200 Amperes. Indeed, the invention may be implemented in other breaker classes including power breakers up to 4000 Amperes and steel frame breakers up to 5000 Amperes.

FIGS. 2–4 and 6 show four methods of sensing a ground fault condition. These sensing methods are more fully described in a 1991 General Electric publication entitled, "Ground-Fault Protection for Solidly Grounded Low-Voltage Systems," pp. 4–7.

The ground fault current can be monitored either as it flows out to the fault or on its return to the neutral point of the source transformer or generator. When monitoring the outgoing fault current, the currents in all power conductors are monitored either individually, such as in FIGS. 2, 3, and 6, or collectively, as shown in FIG. 4. When monitoring the return fault current, only the ground fault return conductor is monitored (not shown).

Figure 2:
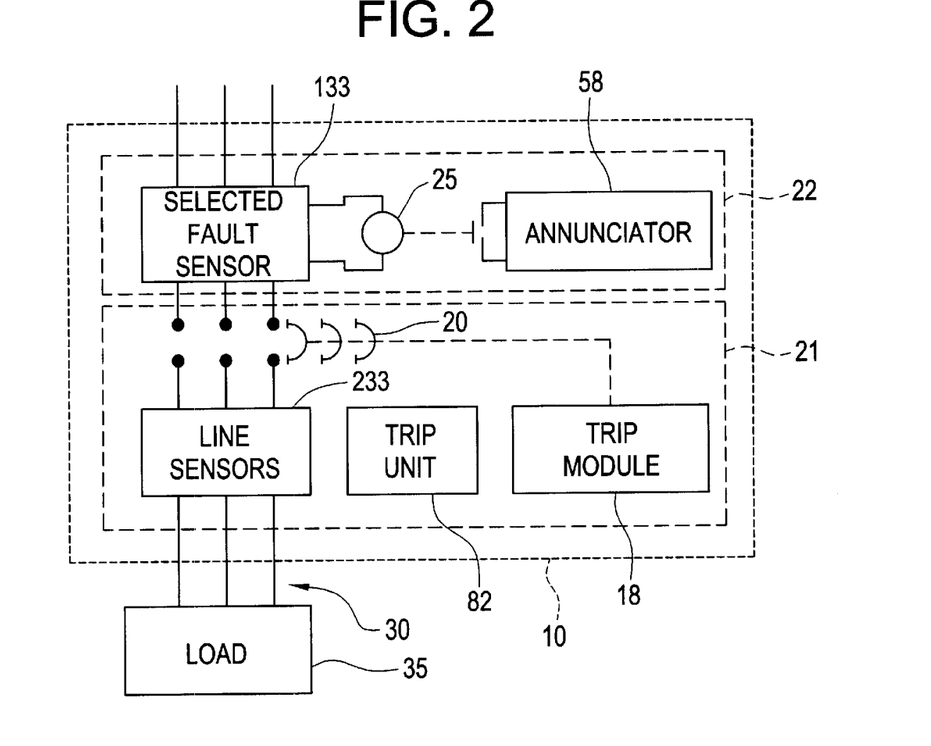
FIGS. 2, 3, 4, and 6 are alternative embodiments to ground fault detection arrangements.

FIG. 2 shows a broken delta ground fault sensing configuration. Current transformers $CT_1$, $CT_2$, and $CT_3$ are connected in series on phase conductors A, B, and C. Voltage $V_{A1}$ provides a signal indicative of a ground fault current. During normal operation, the vectorial addition of voltages from three or four sensors is essentially zero. When a downstream ground fault occurs, the outgoing ground fault current causes a voltage to appear. If the current magnitude is sufficient to produce a voltage equal to, or greater than a predetermined threshold for a predetermined minimum time delay, then the circuit is considered to be in a ground fault condition.

Figure 3:
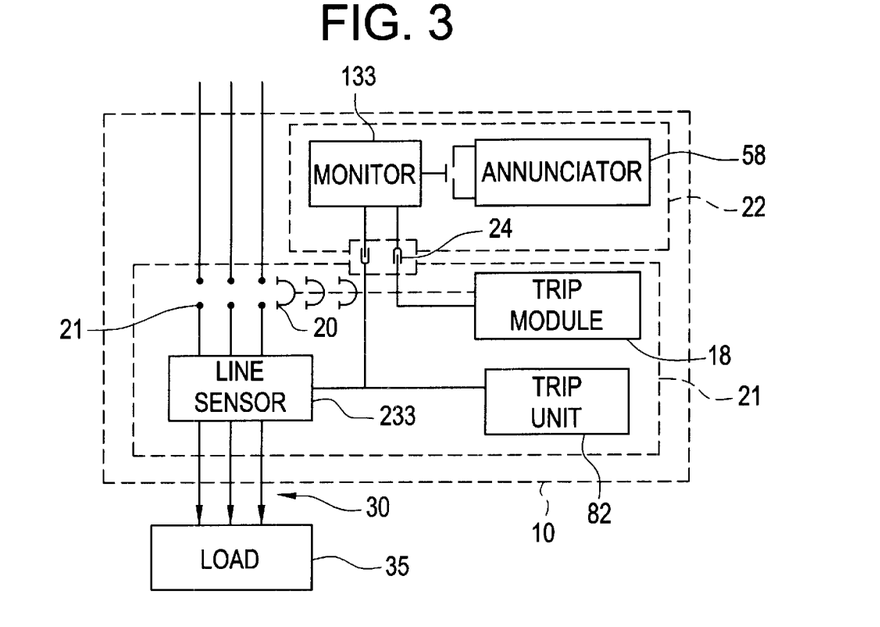
Figure 4:
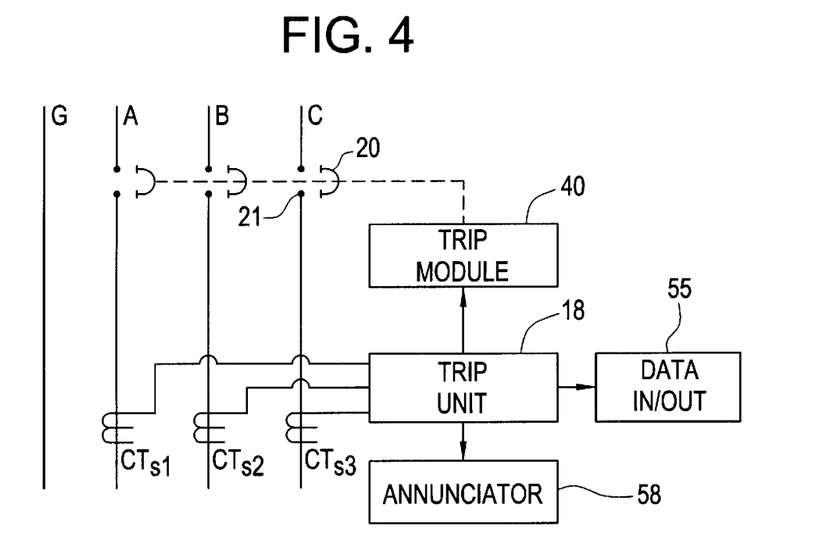

FIG. 3 shows a residual ground fault sensing configuration. In this case, current transformers $CT_1$, $CT_2$ and $CT_3$ are connected in parallel on phase conductors A, B, and C. Here, $V_{A2}$ provides a signal indicative of a ground fault current. The operation is based on the concept that the phase currents in a balanced three-phase system add vectorially to zero. If current transformers correctly transform phase currents to secondary currents, these secondary quantities will also add up to zero. As a consequence, a residually connected ground fault relay will sense zero current during normal, balanced, three-phase operation. For three-phase, three-wire systems, only three current transformers are required as shown in FIG. 3. Three-phase, four-wire systems require four current transformers to "blind" output voltage $V_{A2}$ to any unbalanced line-to-neutral loading current. The fourth current transformer makes it possible to set the output device a sensitive pick-up level regardless of the anticipated unbalanced load current magnitude. If the anticipated worst-case unbalanced line-to-neutral load current is lower than the pick-up setting of the output device, the neutral current transformer in a four-wire system can be omitted.

FIG. 4 shows another ground fault sensing technique known as "Ground Sensor Protection" which is provided by a combination of a window or donut type current transformer $CT_4$, which surrounds all power conductors A, B, C, and N, and provides voltage out $V_{A3}$. In a balanced three-phase system or an unbalanced three-phase, four wire system, the magnetic flux produced by each of the phase and neutral currents has a mutual canceling effect as observed by current transformer $CT_4A$ ground fault current, however, will return through a circuit external to the current transformer, e.g., through conductor G, and therefore not produce a canceling magnetic flux to that produced by the ground current flowing in the phase conductor. Thus the current transformer produces a current output to the relay only for ground fault currents but no significant current output to the relay for normal phase currents. Phase currents in excess of a predetermined threshold for a minimum period of time will be regarded as an indication of a ground fault condition. The current magnitude is dependent on the current transformer configuration and turns ratio, special distribution of the power conductors within the window or donut current transformer, and sensitivity of the relay.

Figure 5:
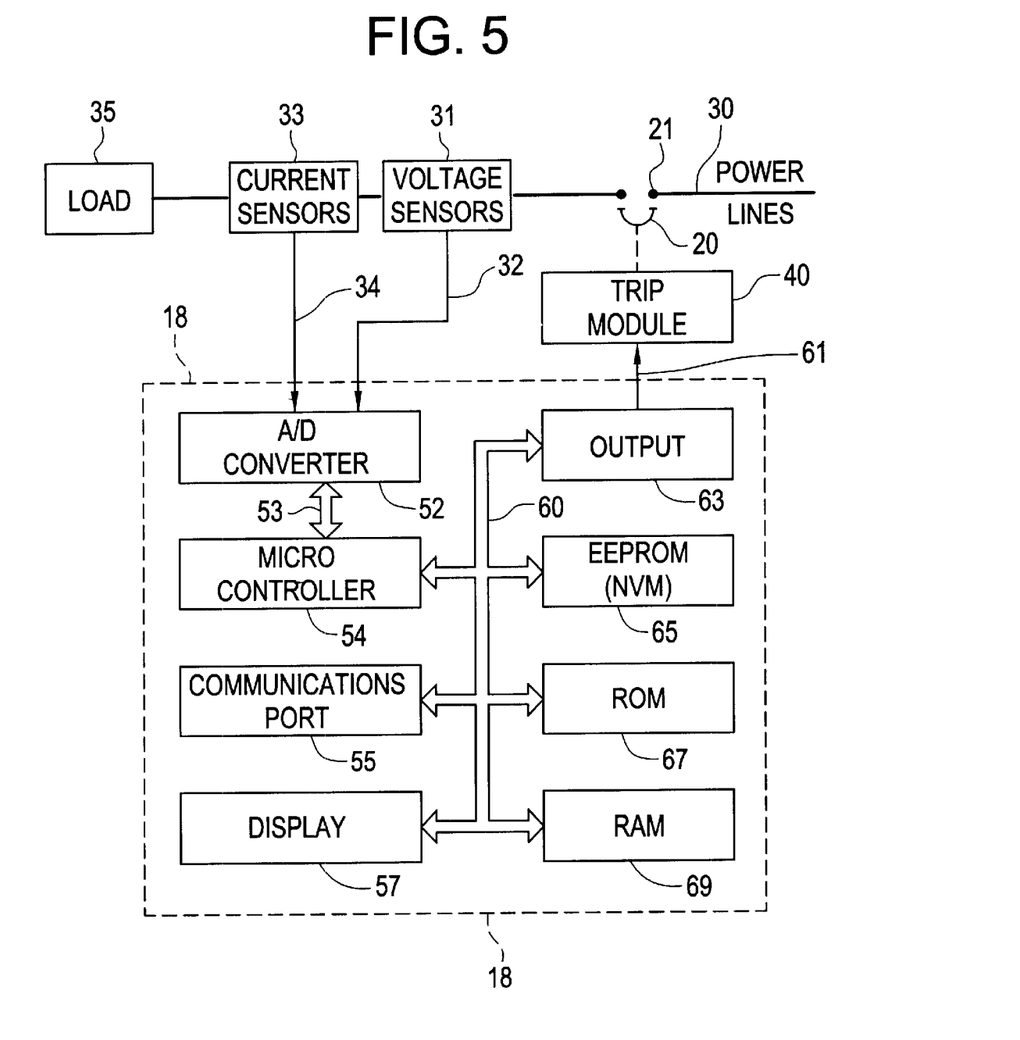
FIG. 5 is an alternative embodiment to FIG. 6 employing sensor configurations such as those in FIGS. 2, 3, and 4.

For the above sensing methods, an output voltage $V_{A1}$, $V_{A2}$, and $V_{A3}$ is indicative of a ground fault condition. If the voltage exceeds a predetermined threshold for a predetermined period of time, then the circuit is considered to be in a ground fault condition. The output voltages $V_{A1}$, $V_{A2}$, and $V_{A3}$ maybe used in a variety of ways. They may connect to a relay 80 matched to the current transformer(s) for closing an annunciator circuit 59 as shown in FIG. 5. Alternatively, the voltage may be applied, after any necessary conditioning, to the inputs in an A/D converter connected in a trip unit as shown in FIG. 6 which is described in more detail below.

A circuit breaker of a first embodiment of the invention will include both a ground-fault sensing and annunciating circuit and a separate over-current trip circuit as shown in FIG. 5. The ground fault sensing circuit in FIG. 5 includes one or more current transformers 133 as previously discussed in connection with FIGS. 2, 3, 4, or 6. The output of current transformers 133 is provided to a relay, processor, or similar device which activates an annunciation circuit 58 when a ground fault condition is sensed. The over-current trip circuit includes current sensors 233 which generate at least one signal indicative of the current in power lines 30. When the current exceeds a predetermined minimum threshold for a predetermined minimum period of time, e.g., when it exceeds the time-current limits defined in associated time-current limit parameters such as are known in the art, relay 82 or similar device activates trip module and separates movable contacts from stationary contacts 21 thereby shutting off current in power lines 30.

Figure 6:
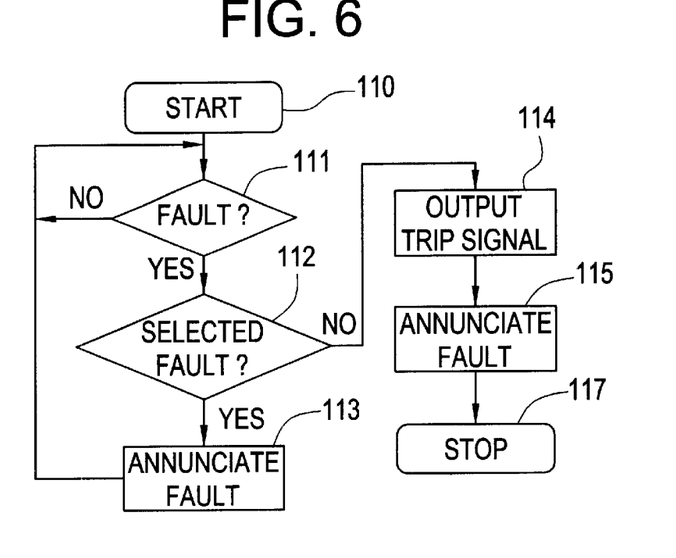

An alternative approach is to provide an integral ground fault sensing configuration as shown in FIG. 6. In this case, the ground fault sensing is integral to the static trip programmer unit. Here, current sensors, such as current transformers $CT_{S1}$, $CT_{S2}$, and $CTS_{S3}$, are connected to an electronic trip unit 18. Ground fault sensing is similar to the residual ground fault sensing configuration previously described. The current transformers are defined as current sensors since these transformers are designed for use only with low burden tip unit 18. Other types of current sensors, such as Hall-effect sensors and giant magnetic resistors may used in place of the current transformer type current sensors shown. For a three-phase, three-wire system, three current sensors, mounted within the circuit breaker, are required. For a three-phase four-wire system (not shown), a fourth current sensor monitoring the neutral may be mounted externally from the circuit breaker, provided the neutral conductor is radial and not grounded after passing through the current sensor. If the worst-case unbalanced line-to-neutral is lower than the pick-up setting of the static relay, the neutral current transformer in a four-wire system can be omitted.

Figure 7:
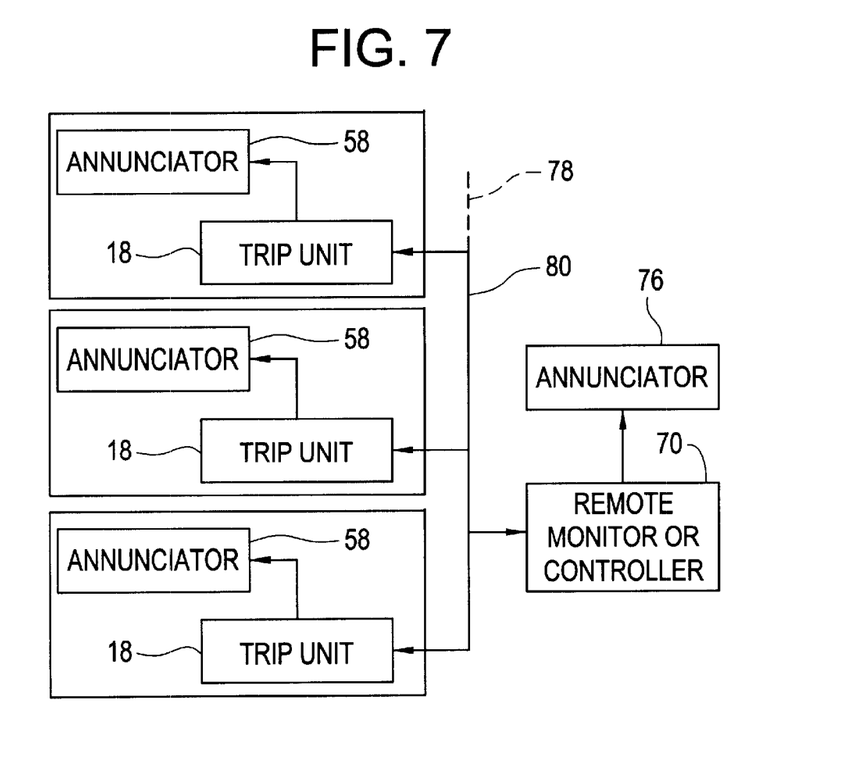
FIG. 7 is a block diagram of a trip unit of the invention.
Figure 8:
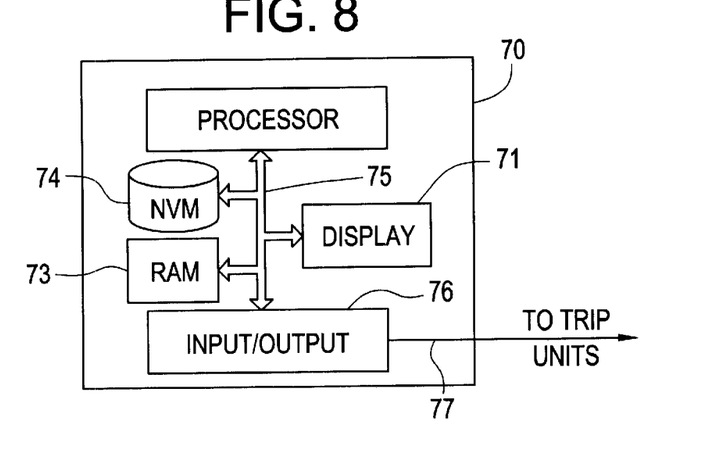
FIG. 8 shows a flow chart for operation of a trip unit of an embodiment of the invention.

The operation of the trip unit 18 is best seen by now referring to FIGS. 7 and 8. Trip unit 18 includes inputs for voltage and current information from sensors 33, 31 via signal lines 34, 32, respectively. Sensors 33, 31 detect the voltage and current in power lines 30 between a source and load 35. Sensor inputs are directed to analog-digital converter 52 where the analog output from sensors 33, 31, are converted into digital information which is then provided to micro controller 54 via data path 53. Micro-controller 54 is connected via data bus 60 to random access memory RAM 69, read-only memory ROM 67, non-volatile memory 65, display 57, communications port 55, and output 63. Non-volatile memory may include, for example, EEPROM (electrically erasable programmable read-only memory), EPROM (erasable programmable read-only memory), flash memory, or other non-volatile memory.

Output 63 generates a trip signal which is transmitted along line 61 to an external trip module 40 which actuates movable contacts 20 to separate from fixed contacts 21 thereby opening the circuit. Trip unit 18 is also capable of outputting information via display 57 which may be LEDs, LCD, or other display means.

Read-only memory 67 or non-volatile memory 65 includes a software program containing instructions readable by controller 54. Non-volatile memory 65 may also include control parameters such as time-current curve information necessary for over-current protection. These control parameters may be updated as needed depending on the application.

In operation, the microprocessor receives information from voltage sensors 31 and current sensors 33. This information is monitored by the processor to determine if a fault condition exists. Referring to FIG. 8, controller 54 begins at step 110 labeled "START", and then proceeds to step 111 where current characteristics are compared with the time-current limits defined by the control parameters. If the current exceeds time-current limits defined by the control parameters, then an over-current condition is determined at step 111 and controller 54 proceeds to step 114 wherein controller 54 instructs output 63 to generate a trip signal. Output 63 generates a trip signal in line 61 in response to a signal from controller 54. Trip module 40 actuates movable contacts 20 in response to a trip signal from trip unit 18, causing movable contacts 20 to separate from stationary contacts 21. Control then proceeds to step 115 wherein, in addition to tripping contacts 20, controller 54 is programmed to annunciate the condition which precipitated the trip by changing display 57 and/or providing an output with such an indication via communications port 55. Once a trip signal is output at step 114 and the fault condition is annunciated at step 115, the control stops at step 117.

If there is no over-current condition, controller 54 proceeds to step 112 to determine if a ground fault condition is detected. A ground fault condition is detected as described above with reference to FIG. 6. In the case of a ground fault condition, controller 54 proceeds to step 113 wherein an annunciation signal is produced via display 57 and/or communications port 55. Controller then proceeds to step 116 which is repeated until an over-current condition occurs. In other words, after annunciating a ground fault, controller 54 continues to monitor for an over-current condition. If an over current condition exists at step 116, then control proceeds to step 114 and continues as discussed above. Note that in a ground-fault condition, controller 54 is not programmed to produce a trip signal and therefore the contacts 20 are not separated from fixed contacts 21 as would be the case in other circumstances.

Any fault condition sensed may be annunciated by illuminating a representative LED on display 57 and/or displaying a message on display 57 that the particular fault condition exists if display 57 has alphanumeric capability. An audible alarm may also be provided for directing attention to the display. As with other fault conditions, the annunciation may take the form of outputting a signal via communications port 55 to a remote monitoring state.

Figure 9:
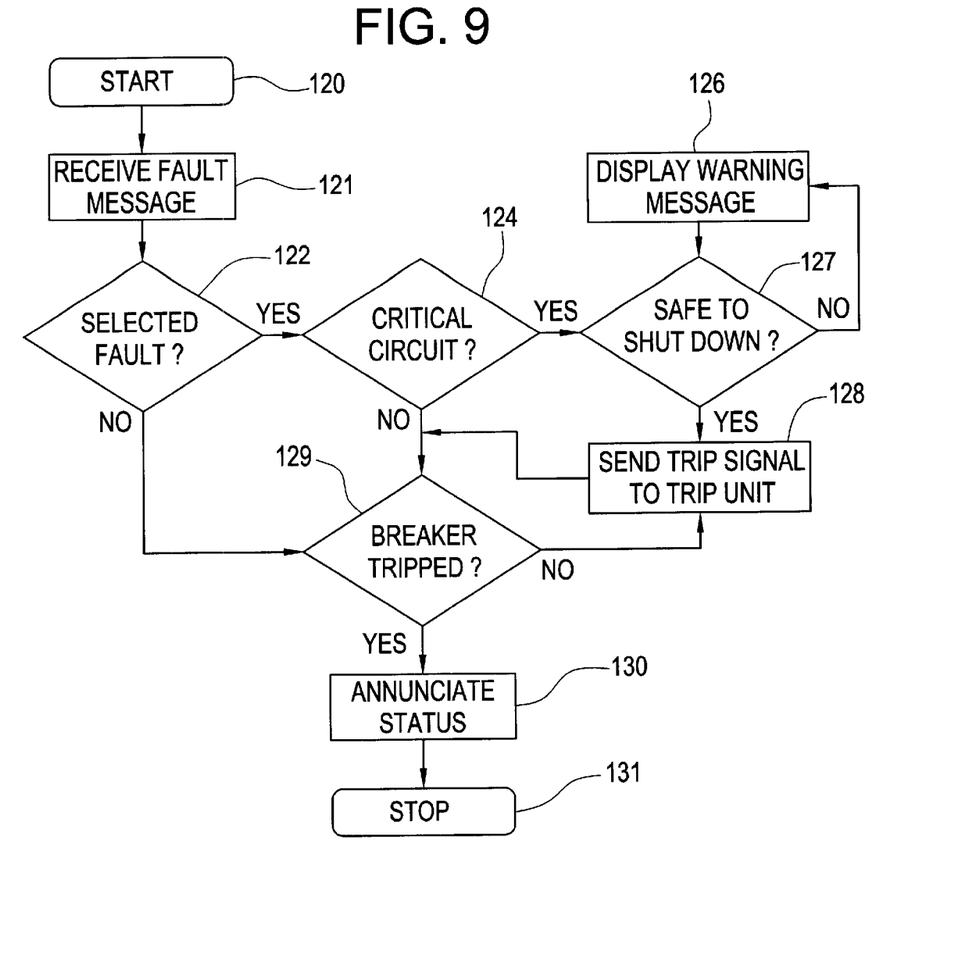
FIG. 9 is a block diagram of implementation of the invention in a control or monitoring network.

FIG. 9 shows a remote monitor/controller 70 connected via network 80 to the communications ports of a plurality of trip units 18. Any number of trip units may be monitored, as indicated by dashed line 78 extending from network 80. Each trip unit 18 includes a local annunciator 58 which may include an audible and/or visible alarm and/or a display.

When a trip unit 18 detects a fault condition, a message is sent via network 80 to remote monitor or controller 70 where it is received. Remote monitor or controller may be a general purpose computer programmed to respond to the fault signal in a variety of ways depending on the circumstances. Referring to FIG. 10, remote monitor/controller 70 that comprises a general purpose computer includes a processor 72 which is connected via a data bus 75 to non-volatile memory 74, random access memory 73, display 71, and input/output 76. Processor 72 responds to programming instructions in the usual way stored on non-volatile memory 74. Random access memory 73 provides a location to store temporary information as is generally known in the art. Input/output 76 is connected to network 80 via signal line 77.

The remote monitor/controller 70 is capable of receiving messages from trip units 18 via its input/output port 76. When such a message is received, it can display it on display 71. It can also query each trip unit to determine its status as to ON, OFF, or TRIPPED, as well as current load levels, i.e., the current and voltage on the line. This information can then be displayed on display 71. Such a display may be in table format, or it may graphically display the trip units, their interconnections in the electrical distribution network, and the status of each. Additionally, it can transmit a message to any selected trip unit to remotely trip that trip unit.

Remote monitor/controller 70 may further be programmed with information as to the nature of the load on each trip unit, and whether any critical systems are served thereby. Critical systems are those that the National Electrical Code permits or requires annunciation-only when a ground-fault condition occurs. For example, in a hospital setting, a particular circuit in each room may be set aside for life-preserving equipment such as a respirator or heart monitor. Alternatively, when such equipment is connected to a circuit, that information may be entered into remote controller/monitor 70. Thus, if critical equipment is connected to a circuit breaker at the time a ground fault message is received from the trip unit, remote monitor/controller 70 merely displays the information, along with a message that a ground fault condition is a fire hazard but this circuit is connected to critical equipment which must be transferred to another circuit before shutting down.

When monitor/controller 70 receives a message from a trip unit indicating a fault condition exists, its programmed response will vary depending on the message and circumstances. The remote monitor/controller is programmed for a desired response which may be to simply display the condition on screen 71. This fault condition may be accompanied by an audible alarm to attract attention to the on-screen message. Another desired response might be to send a trip signal back through network 80 to trip the processor and avoid a potential fire hazard.

FIG. 11 shows a flow chart of one embodiment of remote monitor/controller software implementation. Processor 72 begins at step 120 labeled "START" and proceeds to step 121. When a fault message is received, processor 72 proceeds to step 122 wherein the message is analyzed to determine if it is an indication that a trip unit has detected a ground fault. If the message does not indicate a ground fault, then processor 72 proceeds to step 123 wherein it is directed to annunciate the fault condition, then to step 131 wherein it is directed to stop.

If, at step 122 the message is found to contain an indication that a trip unit has detected a ground fault, then processor 72 proceeds to step 124, where it determines whether the trip unit is on a critical circuit. A trip unit is on a critical circuit if critical equipment, such as a fire pump, life preserving equipment, or industrial processes are connected to it. If not, processor 72 proceeds to step 129 wherein it checks to see that the circuit breaker that sent the message has tripped. If it has tripped, then its status is annunciated at step 130 and the procedure ceases at step 131. If it has not tripped, then processor 72 proceeds to step 128 wherein a trip signal is transmitted to the circuit breaker. Processor 72 then returns to step 129. Once the breaker has tripped, processor 72 proceeds to step 130 where the status of the breaker is annunciated and then to step 131 where the procedure ceases.

If, at step 124, it is determined that the breaker that sent the ground fault message to remote monitor/controller 70 was on a critical circuit, then processor 72 proceeds to step 127 wherein a determination is made whether or not it is safe to shut down, i.e., remotely trip the offending circuit breaker. A circuit is safe to shut down when all such critical equipment is turned off or moved to another circuit. Obviously, if the load has been reduced to zero on that circuit, it is safe to shut down the circuit. However, sometimes that may not be possible and an operator will have to manually authorize the shut-down of the ground-faulted circuit. Thus, if it cannot be verified that the shut-down is safe, then processor 72 proceeds to step 126 wherein a warning message is displayed on display 71. The warning message will not be removed until it can be determined that the offending circuit is safe to shut down at step 127. Once that happens, processor 72 continues to step 128 which instructs processor 72 to send a trip signal to the trip unit in order to shut down the circuit. Processor thereafter continues to step 129 where the breaker status is verified as tripped. Once verification is complete, processor 72 continues to step 130 wherein it annunciates the status and finally the procedure is complete at step 131.

A safe and effective system providing for the annunciation-only of ground-fault occurrences having now been described, it is to be understood that various modifications and substitutions may be made thereto without departing from the spirit and scope of the invention. Accordingly, it is to be understood that the present invention has been described by way of illustration and not limitation.

What is claimed is:

1. A method of protecting a power circuit having a circuit breaker thereon, said method comprising:
   sensing for a fault condition in said power circuit, said fault condition comprising an over-current condition and a ground fault condition;
   annunciating the fault condition at a remote location if said fault condition is sensed;
   tripping the circuit breaker if the fault condition is an over-current condition; and
   if the fault condition is a ground-fault condition:
      checking whether it is safe to shut down the power circuit, and
      sending a trip signal to a trip unit in said circuit breaker from the remote location after determining that it is safe to shut down the power circuit.

2. The method set forth in claim 1 wherein said sensing comprises:
   connecting a ground-fault sensing circuit to said power line to sense for a ground fault condition and
   connecting a current sensing circuit to said power line to sense for an over-current condition.

3. The method set forth in claim 2 wherein said ground-fault sensing circuit comprises at least one current transformer coupled to at least one phase line of said power circuit.

4. The method set forth in claim 1 wherein said sensing for a fault condition comprises:
   coupling a current sensor to each phase wire of the power circuit;
   monitoring said sensors for an imbalance in sensor outputs indicative of a ground fault condition; and
   monitoring said sensors for an over-current condition.

5. The method set forth in claim 1 wherein said annunciating comprises illuminating an LED for communicating that a fault condition occurred and the type of fault condition that occurred.

6. The method set forth in claim 1 wherein said annunciating comprises displaying a message for communicating that a fault condition occurred and the type of fault condition that occurred.

7. The method set forth in claim 1 wherein said annunciating includes a visually communicating to an operator that a fault condidiotn occurred and the type of fault condition that occurred.

8. The method of claim 7 wherein said annunciating further includes generating an audible signal to attract attention to the visual communication.

9. The method of claim 1 wherein said checking whether it is safe to shut down includes:
   determining if the circuit breaker is on a circuit including critical equipment.

10. The method of claim 1 further comprising:
    continuing to check for an over-current condition if the fault condition is a ground fault condition and it is not safe to shut down the power circuit.

11. A trip unit comprising:
    an input for receiving a selection between a first option and a second option;
    an input for inputting signals from a current sensor;
    an analog to digital converter converting said signals into digital form; and
    a controller monitoring said signals and determining whether an over current condition exists and whether a ground fault condition exists, said controller is configured to:
       cause a trip signal to be output when said over-current condition exists,
       cause a trip signal to be output when said ground-fault condition exists and said first option is selected, and
       cause an annunciation signal to be output and no trip signal to be output when said ground-fault condition exists and said second option is selected.

12. The trip unit set forth in claim 11 wherein said annunciation signal comprises a ground fault signal transmitted to a remote monitoring location.

13. The trip unit set forth in claim 11 wherein said annunciation signal is directed towards a display unit for displaying the fault condition.

14. The method of claim 11, wherein said first option indicates that it is safe to shut down.

15. The method of claim 11, wherein said second option indicates that a circuit breaker associated with the trip unit is coupled to a circuit including critical equipment.

16. The method of claim 11, wherein said selection is made at a remote location.

17. A circuit breaker comprising:
    a pair of separable contacts;
    a trip unit;
    a trip module adapted to separate said separable contacts in response to a trip signal from said trip unit; and
    sensing means for sensing current levels in said power circuit;
    said trip unit comprising:
       an input for receiving a selection between a first option and a second option,
       an input for inputting signals from said sensing means,
       an analog to digital converter converting said signals into digital form, and
       a controller monitoring said signal and determining whether an over current condition exists and whether a ground fault condition exists, said controller is configured to:
          cause a trip signal to be output in the when said over-current condition exists,
          cause a trip signal to be output when said ground-fault condition exists and said first option is selected, and cause an annunciation signal to be output and no trip signal to be generated when said ground-fault condition exists and said second option is selected.

18. The circuit breaker set forth in claim 17 wherein said annunciation signal comprises a ground fault signal transmitted to a remote monitoring location.

19. The circuit breaker set forth in claim 17 wherein said annunciation signal is directed towards a display unit for displaying the fault condition.

20. The method of claim 17, wherein said first option indicates that it is safe to shut down.

21. The method of claim 17, wherein said second option indicates that a circuit breaker associated with the trip unit is coupled to a circuit including critical equipment.

22. The method of claim 17, wherein said selection is made at a remote location.

23. A system for protecting critical equipment from electrical fault conditions, the system comprising:
   a circuit breaker comprising:
      separable contacts for connecting in a power distribution circuit providing electrical power to said critical equipment,
      sensing means for sensing current in said power distribution circuit and for generating signal indicative of said current,
      circuitry for generating a trip signal when an overcurrent condition is detected and for generating an annunciation signal and not a trip signal when a ground fault condition is detected, and
      tripping means for separating said separable contacts in response to a trip signal from said circuitry; and a remote monitoring computer, said remote monitoring computer comprising:
      an input/output for receiving said annunciation signal, and
      a processor for processing computer language instructions stored on non-volatile memory accessible by said processor, said instructions causing said remote monitoring computer to implement:
         annunciating the ground fault condition,
         checking whether it is safe to shut down the power circuit when said annunciation is made at said remote location, and
         sending a trip signal to said circuit breaker after determining that it is safe to shut down the power circuit.

24. The system set forth in claim 23 wherein remote monitoring computer further comprises a display and said instructions further comprise instructions causing said remote monitoring computer to implement:
   displaying on said display a warning message of said fault if said checking results in a determination that it is not safe to shut down the power circuit.

25. The method of claim 24 wherein said checking whether it is safe to shut down includes:
   determining if the circuit breaker is on a circuit including critical equipment.

* * * * *